United States Patent [19]
Kondo

[11] Patent Number: 4,540,545
[45] Date of Patent: Sep. 10, 1985

[54] DEVICES FOR SECURING FUEL ASSEMBLIES TO NUCLEAR REACTOR PRESSURE VESSELS

[75] Inventor: Hirofumi Kondo, Kawasaki, Japan

[73] Assignee: Tokyo Shibaura Denki Kabushiki Kaisha, Kanagawa, Japan

[21] Appl. No.: 379,777

[22] Filed: May 19, 1982

[30] Foreign Application Priority Data

May 26, 1981 [JP] Japan .................................. 56-79727

[51] Int. Cl.³ .......................... G21C 3/30; G21C 19/10
[52] U.S. Cl. ..................................... 376/364; 376/434
[58] Field of Search ............... 376/364, 362, 365, 178, 376/434, 446

[56] References Cited

U.S. PATENT DOCUMENTS

| | | | |
|---|---|---|---|
| 2,983,662 | 5/1961 | Shillitto et al. | 376/453 X |
| 3,166,481 | 1/1965 | Braun | 376/364 |
| 3,736,227 | 5/1973 | Nakazato | 376/364 X |
| 3,971,575 | 7/1976 | Lesham et al. | 376/364 X |
| 4,304,631 | 12/1981 | Walton et al. | 376/364 X |

FOREIGN PATENT DOCUMENTS 1159971 7/1969 United Kingdom ................ 376/364

Primary Examiner—Richard E. Schafer
Assistant Examiner—Daniel Wasil
Attorney, Agent, or Firm—Stevens, Davis, Miller & Mosher

[57] ABSTRACT

A device for securing a fuel assembly to a nuclear reactor pressure vessel comprises upper and lower tie plates for supporting the fuel assembly at its lower and upper ends, spacers for supporting the fuel assembly at intermediate portions between the both tie plates, a channel box surrounding the fuel assembly, and a stationary handle attached to the upper tie plate. A movable handle is attached to the stationary handle to be vertically slidable with respect thereto and the movable handle is always urged downwardly by a coil spring. Hook members are connected to the stationary handle to be rotatable in accordance with vertical movement of the movable handle such that the lower end of the hook member engages with an upper grid of the pressure vessel when the movable handle is lowered to a low portion and disengages therefrom when the movable handle is lifted to an upper position.

4 Claims, 7 Drawing Figures

DEVICES FOR SECURING FUEL ASSEMBLIES TO NUCLEAR REACTOR PRESSURE VESSELS

BACKGROUND OF THE INVENTION

This invention relates to a device for fixing fuel assemblies to a nuclear reactor core in a reactor pressure vessel of a boiling water reactor (BWR) for preventing fuel assemblies from upwardly rising and safely inserting a control rod into spaces between channel boxes of the fuel assemblies to promptly shut down the BWR on an occurrence of an emergency such as earthquakes.

FIG. 1 shows a fuel assembly unit of a prior type inserted into an upper grid 20 secured to a reactor core, not shown. The unit generally comprises four fuel assemblies 1 as shown in FIG. 2. Each of fuel assemblies 1 is supported at its lower end by inserting the lower end into a hole provided on a fuel support 23 and at its upper end by the upper grid 20 and channel fasteners 22 which firmly interconnects the respective fuel assemblies 1 thereby to control or limit the horizontal movement or vibration of the fuel assemblies. In a BWR, though the irregular horizontal movement or vibration of the fuel assemblies is thus limited or suppressed, there is no specific means for limiting or suppressing vertical movement or vibration of the fuel assemblies.

During the operation of a BWR, when an emergency such as large earthquake occurs, it is well known to insert a control rod having a cross shaped cross-section between the spaces defined by the channel boxes of the fuel assemblies as shown in FIG. 2 (a top plan view) to rapidly shut down the operation. However, in such case, the fuel assemblies move horizontally in an accelerated manner and flex or bend at their longitudinal central portions. These flexed or bent portions contact with the control rods now being inserted at the time of an emergency, thereby to generate a force for upwardly pushing the fuel assemblies 1, and this upward force is added to the vertical vibration of the fuel assemblies 1 which is caused by the earthquake. The upward force thus amplified may sometimes move upwardly the fuel assemblies 1 to a mechanically unstable position and may be damaged by the subsequent drop of the raised fuel assemblies. Therefore, in order to ensure the insertion of the control rod into the fuel assembly unit thereby to control the operation of a nuclear reactor, it becomes necessary to safely limit or suppress the vertical movement of the fuel assemblies.

SUMMARY OF THE INVENTION

An object of this invention is to provide an improved device for supporting fuel assemblies capable of preventing the fuel assemblies from rising upwardly upon the occurrence of an emergency such as an earthquake.

Another object of this invention is to provide a device for preventing vertical movement of fuel assemblies when control rods are inserted therebetween, the device comprising locking means for engaging a reactor pressure vessel in operation of a nuclear reactor and disengaging smoothly therefrom when the fuel assemblies are removed from the reactor pressure vessel.

According to this invention there is provided a device for securing a fuel assembly to a nuclear reactor pressure vessel comprising upper and lower tie plates for supporting the fuel assembly at its upper and lower end portions, spacers for supporting the fuel assembly at its intermediate points between the upper and lower tie plates, a channel box surrounding the fuel assembly, and a stationary handle attached to the upper tie plate. The device further comprises a movable handle attached to the stationary handle to be vertically slidable with respect thereto, a coil spring for always urging downwardly the movable handle, and hook members connected to the stationary handle to be rotatable in accordance with vertical movement of the movable handle such that the lower end of the hook member engages with an upper grid located in the reactor pressure vessel when the movable handle is lowered to a low position and disengages therefrom when the movable handle is lifted to an upper position.

DESCRIPTION OF THE PREFERRED EMBODIMENTS

Figure 1:
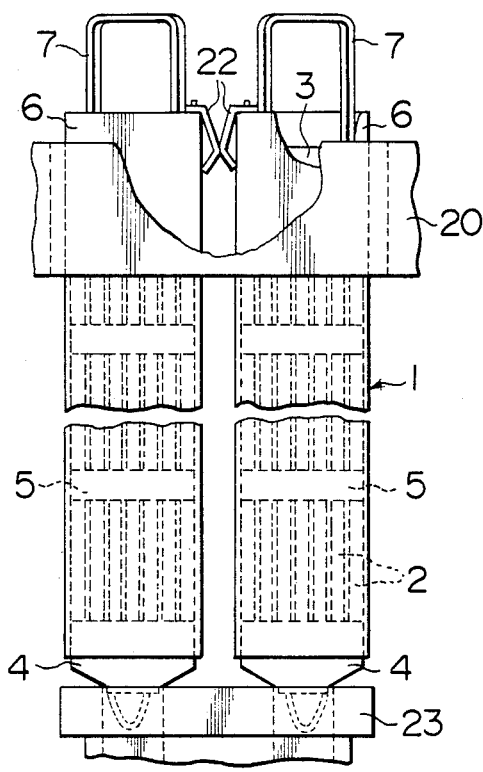
FIG. 1 shows a side view, partially in section, of a fuel assembly unit installed into a reactor pressure vessel supported by a of prior art type device.
Figure 2:
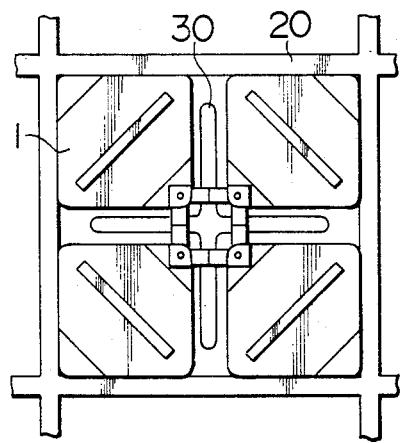
FIG. 2 is a top plan view of FIG. 1 in which a control rod is inserted between the fuel assembly units.
Figure 3:
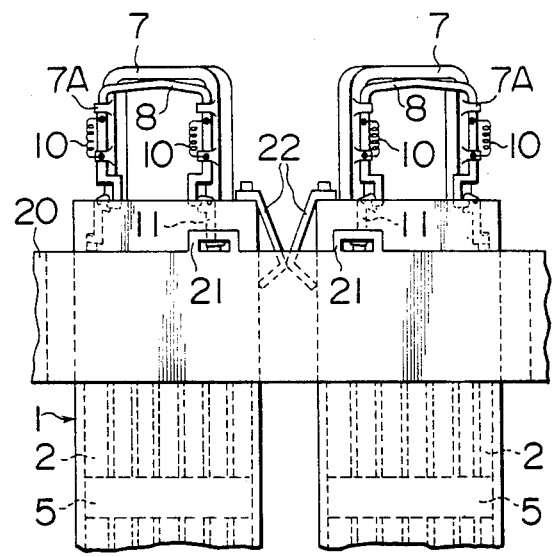
FIG. 3 shows a side view, partially cut away, of a fuel assembly unit installed into a reactor pressure vessel supported by a device according to this invention.
Figure 4:
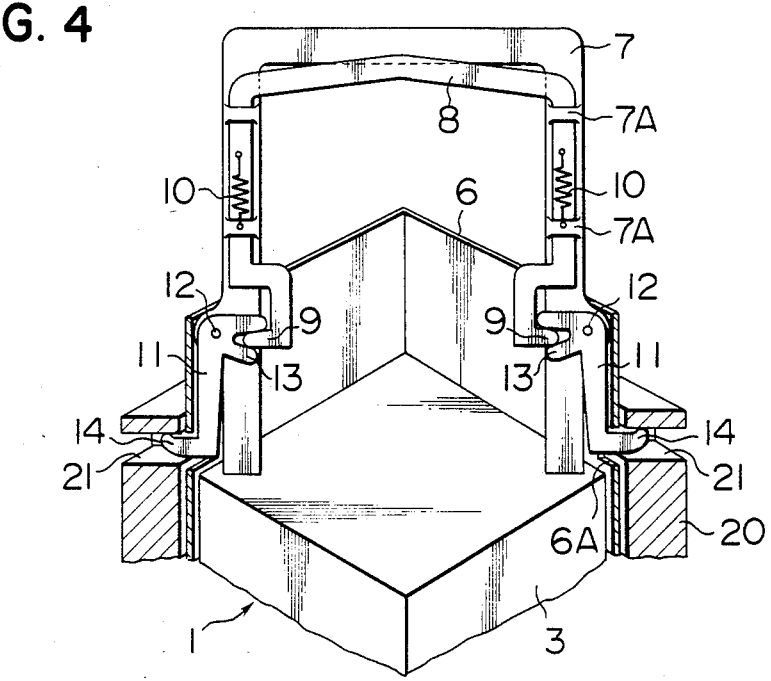
FIG. 4 is a perspective view showing a device according to this invention in which the device is engaged with the reactor pressure vessel.
Figure 5:
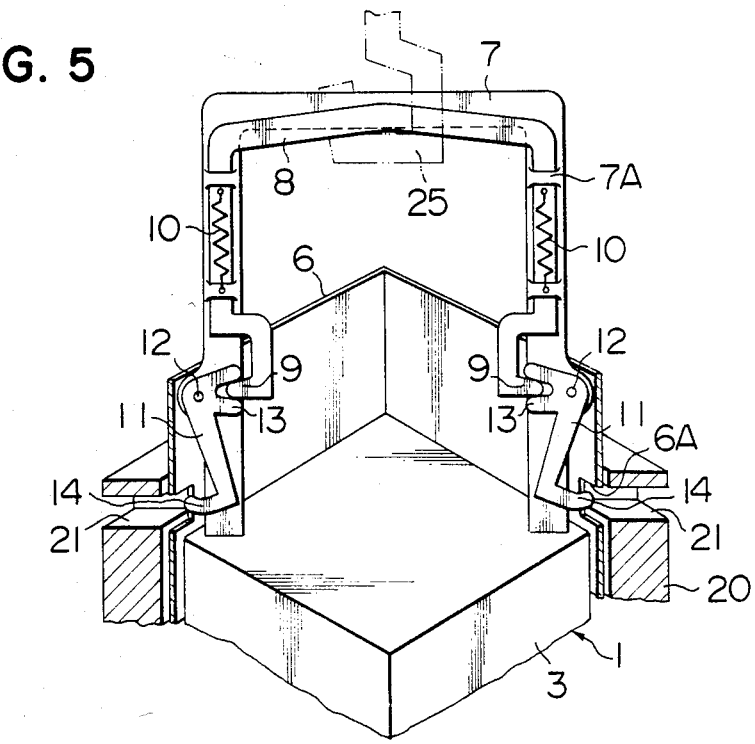
FIG. 5 shows a perspective view similar to FIG. 4 in which the device is disengaged from the reactor pressure vessel.

Referring to FIGS. 3 through 5, an upper grid 20 and a lower support plate, not shown, are arranged in a reactor core of a reactor pressure vessel and the upper grid 20 is provided with a plurality of through holes through which fuel assembly units, each comprising four fuel assemblies 1, are installed respectively. Each fuel assembly 1 comprises a plurality of fuel rods which are supported by an upper tie plate 3 (FIG. 1) at its upper portion, by a lower tie plate 4 (FIG. 1) at its lower end, and by fuel spacers 5 located between the upper and lower tie plate with suitable spaces. The outer surface of the fuel assembly 1 is entirely surrounded by a channel box 6. An inverted U-shape stationary handle 7 is attached to the upper tie plate 3 along the diagonal line of the top portion thereof and a movable handle 8, which has substantially the same shape as that of the handle 7, is attached thereto so as to be vertically movable, for example, in a manner that legs of the movable handle 8 can be slidably inserted through a pair of upper and lower guide members 7A mounted on the legs of the stationary handle 7 and supported by spring means described hereunder. It will be desirable for the handle 8 to have a horizontal top portion which is slightly bent upwardly at its central portion.

The movable handle 8 is urged downwardly by spring means 10, preferably tension coil springs as shown in FIG. 3, which are attached to the legs of the movable handle 8 at their upper ends and to the lower guide members 7 at their lower ends, respectively. When the handle 8 is slidably pulled upwardly by engaging it with a mast hook 25, shown by dotted lines in FIG. 5, the springs 10 extend upwardly to a position where the upper horizontal portion of the handle 8 comes into contact with the upper horizontal portion of the stationary handle 7 and at this position both handles 7 and 8 engage with the mast hook 25. It will be required for the tension spring 10 to have a spring force only sufficient for engaging a projected one end of a hook member, described hereinafter, with a groove 21 provided for the upper grid 20 when the movable handle 8 is lowered, so that the restoring force of the spring 10 at a time when the movable handle 8 is lifted and comes into contact with that of the handle 7 is considered to be significantly smaller in comparison with the entire weight of the fuel assembly 1.

Hook members 11 having an arm shape are pivotally attached to the legs of the handle 7 or upper tie plate 3 with pins 12 in a manner to be rotatable thereabout when the handle 8 is moved vertically. The engagement of each hook member 11 with the corresponding leg of the movable handle 8 can be achieved by engaging a projection 9 of an inwardly U-shaped end portion of the leg with a bifurcated upper end portion of the hook member 11 which is also provided with an outwardly projecting lower end portion 14 which is engaged with a groove 21 provided for the upper grid 20, the groove 21 being communicated with an opening 6A provided for the channel box 6 when the movable handle 8 occupies its lower position, and released from the groove 21 when the movable handle 8 is pulled upwardly by the mast hook 25. These states of the hook members 11 are clearly shown in FIGS. 4 and 5. Thus, briefly stated the hook members 11 are rotated about the pins 12 to engage with or disengage from the upper grid 20 in accordance with the vertical movement of the movable handle 8. Since the vertical motion of the movable handle 8 is converted into the rotation of the hook member 11, it will easily be understood that a rack and pinion engagement may be utilized between the handle 8 and the hook member 11 and another combination of suitable members may be used within the scope of this invention. Moreover, with the illustrated embodiment, roller means, not shown, may be provided on either one of the projection 9 or bifurcated member 13 for smoothly engaging the hook member 11.

At the time of loading the fuel assembly which is now suspended by the mast hook 25 through the stationary and movable handles 7 and 8, the hook members 11 do not engage with the upper grid 20 but are received within the channel box 6, so that the suspended fuel assembly can be smoothly lowered into the upper grid 20 of the reactor core. When the lower end of the fuel assembly 1 has been settled on the fuel support 23 (FIG. 1), the mast hook 25 is disengaged from the handles 7 and 8 and only the handle 8 is then lowered by the restoring force of the tension coil springs 10. This downward movement of the handle 8 is converted into the rotation of the hook members 11 about the pins 12 through the engagement of the projections 9 with the bifurcated portions 13 of the hook members 11 whereby the lower end projection 14 of the hook member 11 would project into the groove 21 of the upper grid 20 through the opening 6A of the channel box 6.

When it is required to remove the fuel assembly 1 from the upper grid 20 of the reactor core, the mast hook 25 is first engaged with the horizontal top portion of the movable handle 8 to pull the same upwardly. The hook members 11 are then rotated about the respective pins 12 to disengage the lower ends 14 of the hook members 11 from the grooves 21 of the upper grid 20. Under such condition, the handle 8 can move upwardly together with the handle 7 to smoothly take out the fuel assembly of the reactor core.

As is apparent from the foregoing description, with an operative connection or engagement with the movable handle 8, tension coil spring 10, hook members 11 and upper grid 20 shown in the preferred embodiment of this invention, when the movable handle 8 moves upwardly or downwardly, the hook members 11 are caused to disengage from or engage with the grooves 21 of the upper grid 20 of the reactor core. In a normal operating condition of the BWR, in which the fuel assemblies are loaded into the reactor core, the movable handle is caused to assume its lowered position by the spring means, and the hook members are firmly engaged with the upper grid, whereby the vertical as well as horizontal vibrations and movements of the fuel assemblies can be safely prevented even when an emergency such as an earthquake occurs.

The removal of the fuel assemblies from the reactor core, for example, in case of unloading the assemblies can be achieved only by upwardly pulling the movable handle with the mast hook. At this time, the hook members are caused to disengage smoothly from the upper grid of the reactor core and the fuel assembly is then completely pulled away therefrom by further lifting upwardly the movable handle together with the stationary handle with the mast hook.

The device according to this invention has a simple construction, so that it can easily be attached to conventional fuel assembly supporting means only by slightly changing the construction of the conventional device of this kind and the device is durable for long use in water having high temperature in the reactor core with high precision and reliability.

Figure 6:
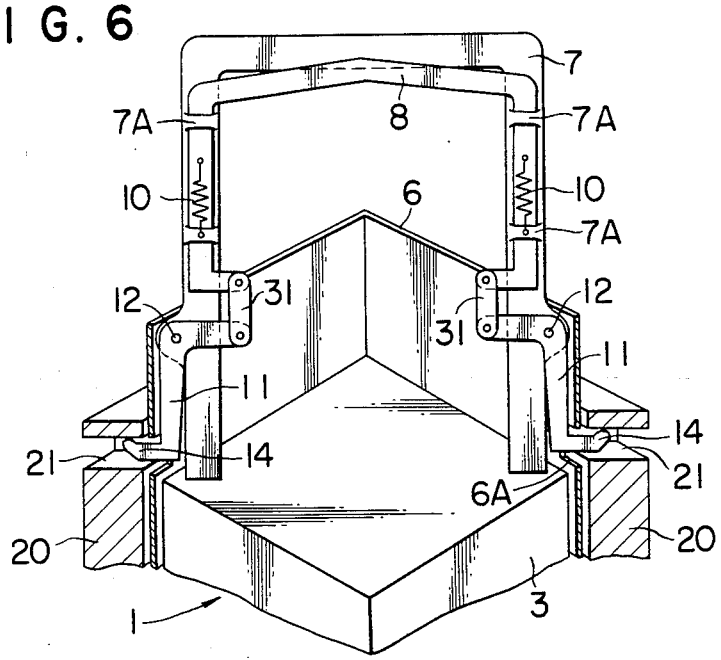
FIGS. 6 and 7 show perspective views of a device of another embodiment of this invention showing states corresponding to FIGS. 4 and 5, respectively.
Figure 7:
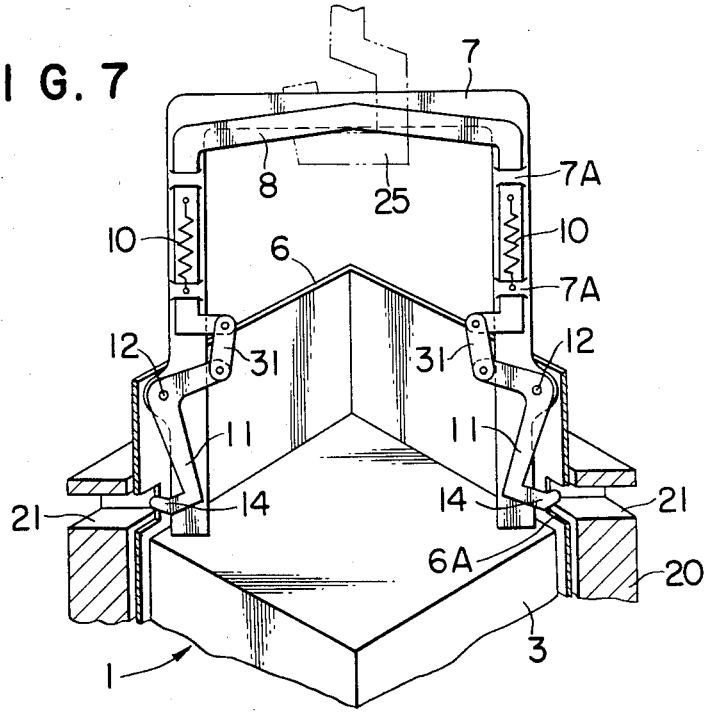

FIGS. 6 and 7 show another embodiment of this invention, in which the movable handle 8 is provided with inwardly projecting lower end portions, which are connected through links 31 to upper portions of generally Z-shaped hook members 11, respectively. With this embodiment, when the movable handle 8 is pulled upwardly and suspended together with the stationary handle 7 by the mast hook 25, the hook members 11 are rotated about the pins 12 in directions in which the lower end portions 14 of the hook members disengage from the grooves 21 of the upper grid 20 as shown in FIG. 7. On the other hand, when the fuel assembly is loaded into the reactor core and settled on the supporting member, the mast hook 25 disengages the handles 7 and 8 and the handle 8 is then slidably lowered by the action of the tension coil springs 10. The lowering of the handle 8 renders the hook members 11 to rotate about the pins 12 in directions in which the lower end portions 14 of the respective hook members 11 engage with the corresponding grooves 21 of the upper grid 20 thereby to firmly lock the fuel assembly in position.

According to a device of this invention for firmly supporting a fuel assembly unit in a reactor core of a BWR, the fuel assembly unit loaded in the reactor core can be firmly secured thereto so as not to move or vibrate upwardly, so that any accidental upward movement of the fuel assembly can be prevented thereby to safely insert the control rod to promptly control the reactor core upon occurrence of an emergency. Moreover, when it is required to unload the fuel assembly unit, it can be readily removed by using no additional specific means. The device has a simple construction which can be applied to a conventional device only by slightly changing the design thereof and is durable for long time use with high precision and reliability.

I claim:

1. In a nuclear system having a fuel assembly and a grid, for securing said fuel assembly to said grid comprising:

upper and lower tie plates for supporting said fuel assembly at its upper and lower end portions;

spacers for supporting said fuel assembly at intermediate portions between said upper and lower tie plates;

a channel box surrounding said fuel assembly;

a stationary handle attached to said upper tie plate;

a movable handle mounted on said stationary handle to be vertically slidable between upper and lower positions with respect thereto;

said movable handle having substantially the same shape as said stationary handle;

spring means having one end connected to said stationary handle and the other end connected to said movable handle for always downwardly urging said movable handle; and locking means mounted on said stationary handle to be pivotable in accordance with vertical movement of said movable handle, said locking means engaging with said movable handle and said grid said grid supporting said fuel asembly at its upper portion and said locking means being operatively secured to said grid when said movable handle is lowered and being disengaged therefrom when said movable handle is in said upper position.

2. The device according to claim 1 wherein said locking means comprises a hook member having a bifurcated upper portion which engages a lower end of said movable handle and an outwardly projecting lower end which engages said upper grid when said movable handle is lowered.

3. The device according to claim 2 wherein said hook member has a generally Z-shaped configuration having an upper portion which is connected to the lower end of said movable handle through a link member.

4. The device according to claim 1 wherein said stationary handle has vertical leg portions on which there are provided guide members through which leg portions of said movable handle are inserted to slide in the vertical direction.

* * * * *